(12) United States Patent
Shah-Nazaroff et al.

(10) Patent No.: US 6,330,718 B1
(45) Date of Patent: Dec. 11, 2001

(54) CONSUMPTION DISTANCE BASED CUSTOMIZED RENDERING OF ENTERTAINMENT PROGRAMMING

(75) Inventors: Anthony A. Shah-Nazaroff, Santa Clara; Christopher D. Williams, Soquel, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/182,502

(22) Filed: Oct. 30, 1998

(51) Int. Cl.$^7$ .................................................. H04N 5/445
(52) U.S. Cl. ............................ 725/37; 348/553; 345/747
(58) Field of Search ....................................... 345/327, 333, 345/334, 744, 745, 746, 747; 348/10, 13, 553, 92, 93, 778; 455/6.2, 6.3; 725/37; H04N 7/16, 7/173

(56) References Cited

U.S. PATENT DOCUMENTS

| | | | |
|---|---|---|---|
| 4,769,697 | * 9/1988 | Gilley et al. | 358/84 |
| 5,204,919 | * 4/1993 | Murakami | 382/54 |
| 5,548,346 | * 8/1996 | Mimura et al. | 348/738 |
| 5,945,988 | * 8/1999 | Williams et al. | 345/327 |
| 6,005,607 | * 12/1999 | Uomori et al. | 348/42 |
| 6,188,439 | * 2/2001 | Kim | 348/553 |
| 6,240,551 | * 5/2001 | Webb et al. | 725/68 |

OTHER PUBLICATIONS

International Search Report, PCT/US99/25582, Oct. 28, 1999, 4 pages.

* cited by examiner

*Primary Examiner*—Chris Grant
(74) *Attorney, Agent, or Firm*—Blakely, Sokoloff, Taylor & Zafman LLP

(57) ABSTRACT

An entertainment system sets a number of operating parameters to a number of parameters values in view of a consumption distance of an entertainment program. The entertainment system then renders the entertainment program for the consumption distance using the parameter values set for the operating parameters.

66 Claims, 6 Drawing Sheets

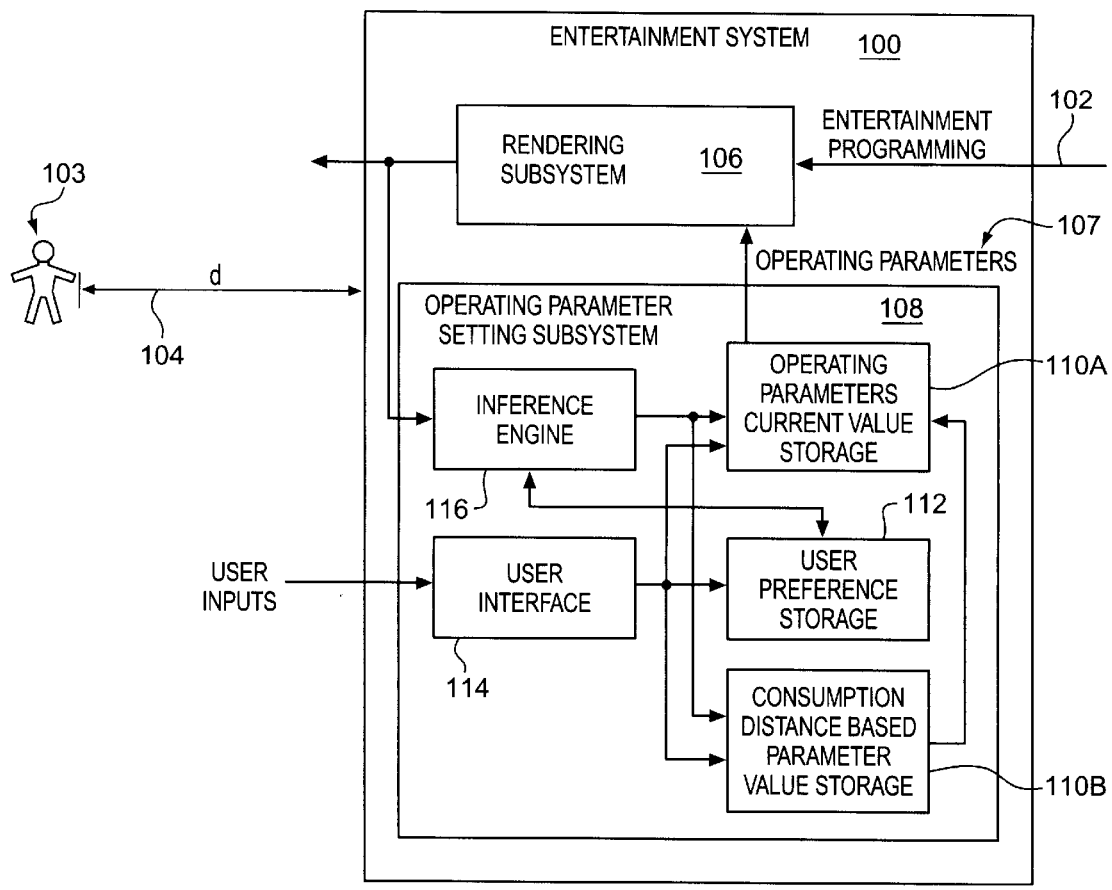

ENTER DESIRED VIEWING/LISTENING DISTANCE:

SELECT DESIRED VIEWING/LISTENING DISTANCE:

SELECT DESIRED VIEWING/LISTENING DISTANCE:

US 6,330,718 B1

CONSUMPTION DISTANCE BASED CUSTOMIZED RENDERING OF ENTERTAINMENT PROGRAMMING

BACKGROUND OF THE INVENTION

1. Field of the Invention

The present invention pertains to the field of entertainment systems. More particularly, the present invention relates to customized rendering of entertainment programs.

2. Background

Numerous customizations of rendering of an entertainment program are known in the art. For examples, the audio volume as well as the color intensities of the video images of an entertainment program may be customized to the desire of a user (consumer) of the entertainment program. However, with the convergence of the electronics and the computer industry, increasing varieties as well as quantities of entertainment programs are being made available to the users. For examples, with one of these "convergent" systems, a user can easily have access to broadcast programming from conventional air wave, cable as well as satellite, video on demand, pay per view, and other "web-based" entertainment programs. The term "entertainment program" as used herein in the specification and in the claims include all these forms of "entertainment" and the like. Along with increased varieties and quantities of entertainment programming comes increased number of options or operating parameters to be customized, e.g. cell sizes, font sizes and so forth. As a result, a user of one of these "convergent" systems has a lot more choices or decisions to make. While the end result may enrich the consumption experience of the user, the customization process itself is a complicated and frustrating experience to most users. Thus, a more user friendly and effective approach to customizing rendering of entertainment programming is desired.

SUMMARY OF THE INVENTION

A method and apparatus for consumption distance based customized rendering of entertainment programming is disclosed. In accordance with the present invention, an entertainment system sets a number of operating parameters to a number of parameters values in view of a consumption distance of an entertainment program. The entertainment system then renders the entertainment program for the consumption distance using the parameter values set for the operating parameters.

In one embodiment, the entertainment system is equipped to enable the consumption distance to be provided by a user. In an alternate embodiment, the entertainment system is equipped to enable the consumption distance to be dynamically determined.

BRIEF DESCRIPTION OF THE DRAWINGS

The present invention is illustrated by way of example and not limitation in the figures of the accompanying drawings, in which like references indicate similar elements and in which:

FIG. 1 is a block diagram illustrating one embodiment of an entertainment system incorporated with the teachings of the present invention;

FIG. 2 illustrates an exemplary table of consumption distance based parameter values suitable for use to practice the present invention;

DETAILED DESCRIPTION

Figure 3A:
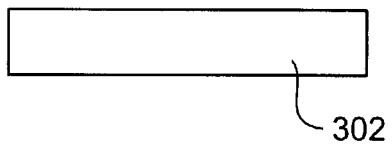
FIGS. 3a–3c illustrate a number of exemplary end user interfaces suitable for use to facilitate user input of the desired consumption distance.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

The description will be presented in a manner using terminology commonly employed by those skilled in the art to convey the substance of their work to others skilled in the art. Parts of the description will be presented in terms of operations performed by a computer system, using terms such as data, flags, bits, values, characters, strings, numbers and the like. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order the steps are presented.

Referring now FIG. 1, wherein a block diagram illustrating an overview of the present invention in accordance with one embodiment is shown. As illustrated, entertainment system 100 receives entertainment programming 102. In response, entertainment system 100 renders entertainment programming 102 for consumption by user 103 in accordance with the current values of scalable operating parameters 107, which for selected ones, in accordance with the present invention, are automatically set in view of consumption distance (d) 104. As described earlier, entertainment programming 102 includes a wide range of publicly broadcast/on-demand as well as privately rendered programming, in particular, but not limited to television and "web based" programming.

For the illustrated embodiment, entertainment system 100 includes rendering subsystem 106 and operating parameter setting subsystem 108 operatively coupled to each other as shown. As shown, operating parameter setting subsystem 108 includes operating parameter current value storage 110a, user preference storage 112, consumption distance based parameter value storage 110b, user interface 114, and inference engine 116, operatively coupled to each other and to rendering subsystem 106 as shown.

As described earlier, rendering subsystem 106 is used to render received entertainment programming 102 in accordance with the current values of operating parameters 107, which for selected ones, are automatically set in view of consumption distance (d) 104. Operating parameter current value storage 110a is used to store the current values of the operating parameters, including the selected ones that are set in view of consumption distance (d) 104, whereas consumption distance based operating parameter storage 110b is used to store a collection of parameter values for a number of operating parameters for various consumption distances (d) 104 for entertainment programming. User preference storage 112 is used to store various user preferences, including at least one preference for consumption distance (d) 104, which as described earlier, may be set statically or dynamically. In one embodiment, user preference storage 112 merely stores one preference for consumption distance (d) 104. In alternate embodiment, user preference storage 112 stores multiple preferences for consumption distance (d) 104 for various entertainment programming types and user identities.

User interface 114 is used to facilitate user inputs for various user preferences, including the one or more preferences for consumption distance (d) 104 described earlier, whereas inference engine 116 is used to automatically determine an appropriate consumption distance (d) 104 for used to set the current parameter values of selected ones of the operating parameters. In one embodiment, as described earlier, a user may provide a preference for consumption distance (d) 104 for all entertainment programming, e.g. 10 ft. For this embodiment, as will be described in more detail below, in response to the provision of consumption preference (d) 104, user interface 114 causes the appropriate current values of the applicable operating parameters to be selected from storage 110b and stored into storage 110a. In other embodiments, a user may provide multiple preferences for consumption distances (d) 104 for different entertainment programming types and user identities ,e.g., for User A, action movies and sport, 10 ft., news, 15 ft.; for User B, action movies and sport, 15 ft., soap opera, 10 ft., and so forth. For these embodiments, inference engine 116 is used to dynamically determine an appropriate selection for consumption distance (d) 104. As will be also described in more detail below, in response to the dynamically inferred appropriate selection for consumption preference (d) 104, inference engine 116 also causes the appropriate current values for the applicable operating parameters to be selected from storage 110b and stored into storage 110a.

Entertainment programming 102 is intended to represent a broad range of multi-media programming, including but not limited to publicly broadcast television and radio programming received through a number of transport media, such as AM/FM, VHF/UHF, cable, satellite and the like, as well as privately performed audio and video programming "retrieved" off a number of distribution media, such as tapes, diskettes, compact disks (CD), digital versatile disk (DVD), and the like.

As to rendering subsystem 106, except for the fact that it renders entertainment programming 102 in accordance with the current values of operating parameters that for selected ones, are automatically set in view of consumption distance (d) 104, rendering subsystem 106 is intended to represent a wide range of components and circuitry commonly found in receivers/amplifiers, televisions, video cassette players, CD/DVD players, and the like. These components and circuitry are well known, and will not be further described. However, the manner in which rendering subsystem 104 is used in the context of the present invention will be later described in more detail below with references to FIGS. 4a–4b.

Figure 3B:
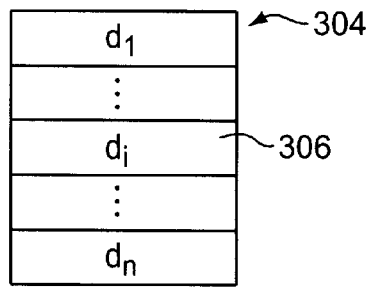
Figure 3C:
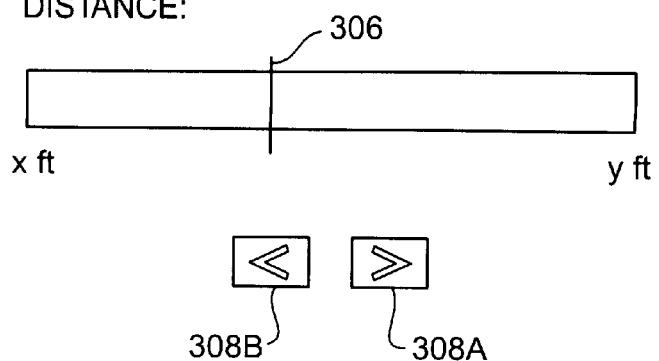

Operating parameter storage 110a–110b as well as user preference storage 112 are all intended to represent a broad range of storage medium known in the art, including but not limited, disk drives and non-volatile memory. Their constitutions are also well known, and will not be further described either. Similarly, user interface 114 is also intended to represent a broad range of user interfaces known in the art for facilitating user inputs. A number of exemplary end user interface features suitable for use to facilitate provision of a desired consumption distance (d) 104 are shown in FIGS. 3a–3c, to be described more fully below. Inference engine 116 is intended to represent a broad range of artificial intelligence engine known in the art. In one embodiment, it infers the identity of the user based on characteristics of the current entertainment program and previously collected entertainment programming consumption data. As will be described in more details below, in one embodiment, the inferred user identity in conjunction with the current entertainment program type are then used to determine the appropriate selection for consumption distance (d) 104. An example of such inference engine is disclosed in U.S. patent application Ser. No. 08/866,707, filed on May 30, 1997, and titled "Method and Apparatus for Automatically Determining and Dynamically Updating User Preferences in an Entertainment System. The manner in which inference engine 116 is used in the context of the present invention will also be described in more detail below with references to FIGS. 4a–4b.

FIG. 2 illustrates an exemplary table of consumption distance based parameter values suitable for use to practice the invention is shown. As illustrated, exemplary table 200 includes multiple columns of parameter values 202, one for each consumption distance (d) 104. Each column of parameter values 202 includes a number of parameter values 204, one for each scalable operating parameter. Examples of scalable operating parameters, as shown, include font sizes, icon sizes, button sizes, and so forth. As described earlier, exemplary table 200 is stored in consumption distance based parameter value storage 110b. In other embodiments, other data structure organizations may be employed instead.

FIGS. 3a–3b illustrate three exemplary embodiments of an end user interface feature suitable for use to facilitate input of a consumption distance preference by a user. FIG. 3a represents a keying approach, including data entry field 302, whereas FIG. 3b represents a selection list approach, including list 304 with multiple list entries 306. FIG. 3c represents a sliding bar approach, including sliding bar 306 and sliding direction buttons 308a–308b.

In one embodiment, a selected one of these approaches or equivalent is provided to facilitate a user to provide a consumption distance preference for entertainment programming. In other embodiments, a selected one of these approaches or equivalent is repeatedly provided to facilitate a user to provide a consumption distance preference for each combination of user and entertainment programming type.

Figure 4A:
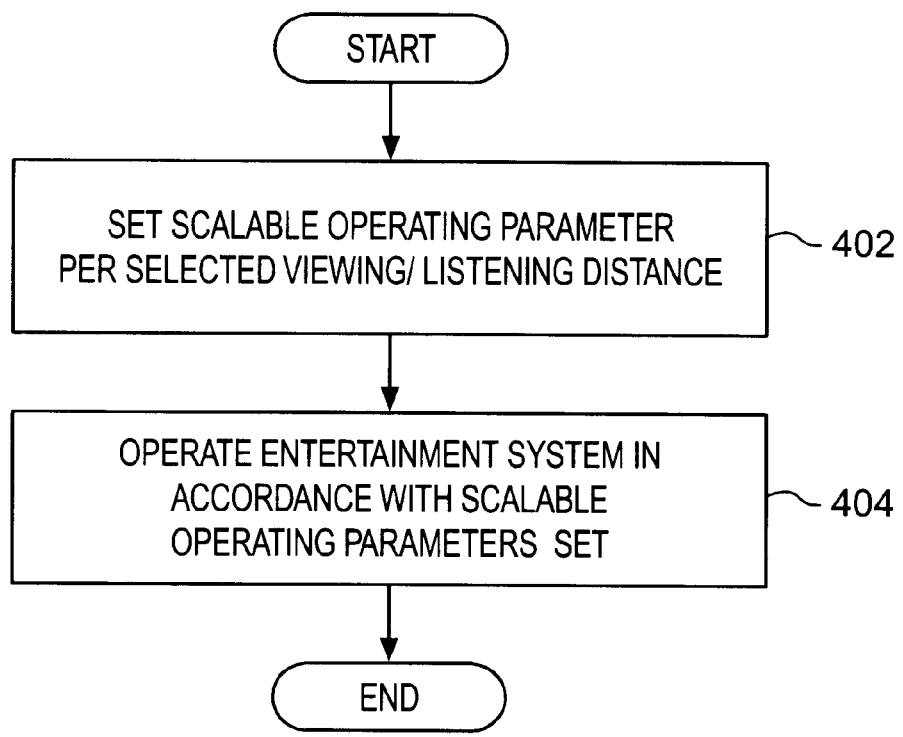
FIGS. 4a–4b are two flow charts illustrating two embodiments of the method steps of the present invention.

FIG. 4a illustrates one embodiment of the method steps of the present invention. As shown and described earlier, in step 402, in response to the receipt of a consumption distance preference from a user, user interface 114 causes an appropriate column of parameter values 202 to be output from consumption distance based parameter value storage 110b and stored into operating parameter current value storage 110a, step 402. Next, at step 404, rendering subsystem 106 renders received entertainment programming 102 in accordance with the current values of operating parameters stored in storage 110a, including those automatically set in view of the consumption distance preference inputted by the user. Those skilled in the art will appreciate that the described novel approach will significantly reduce the complexity and simplify the customization task for the user, which in turn will improve the user's consumption experience.

Figure 4B:
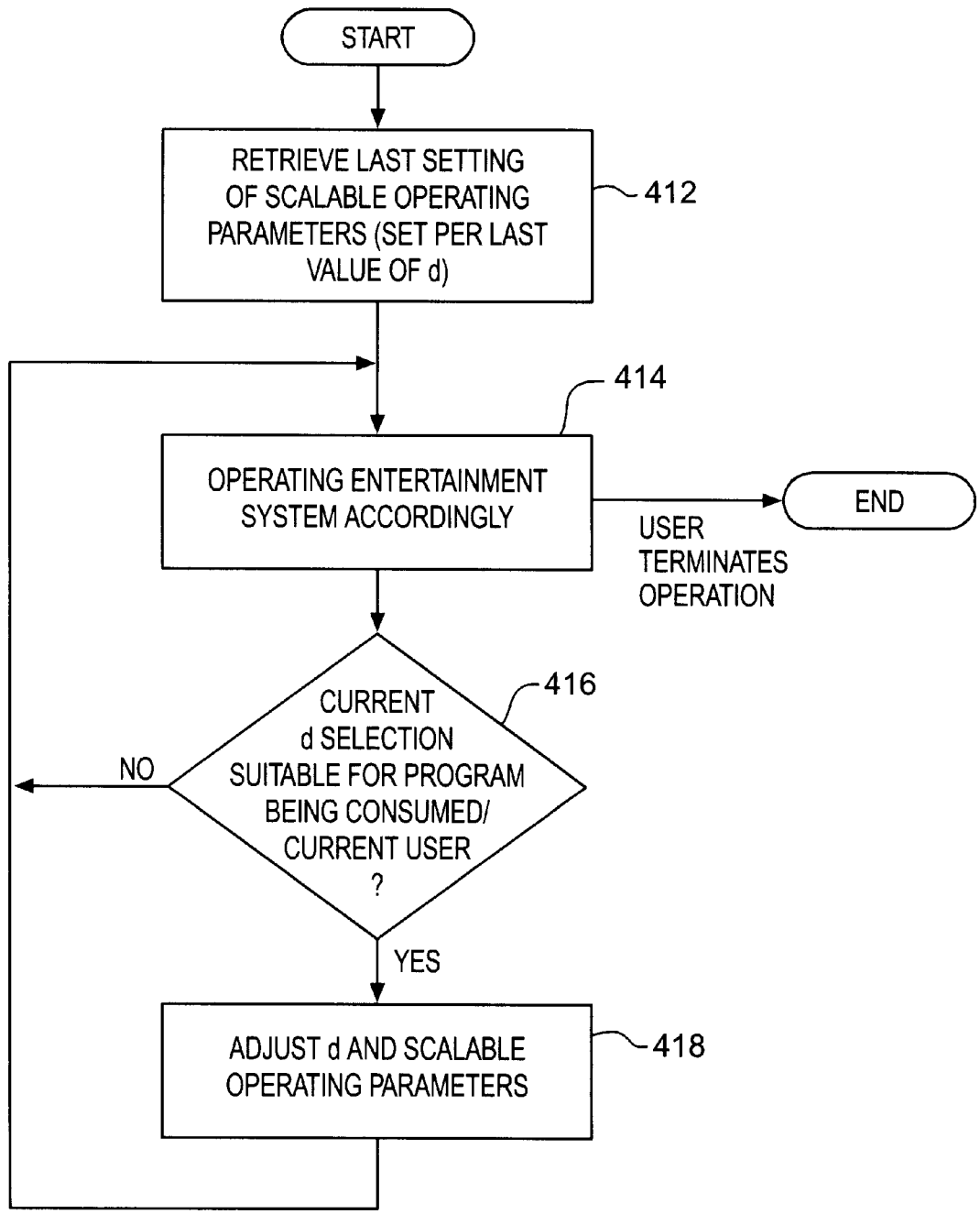

FIG. 4b illustrates another embodiment of the method steps of the present invention. As shown, in step 412, rendering subsystem 106 first retrieves the last setting for the scalable operating parameters, and then at step 414, renders the received entertainment programming 102 in accordance with these retrieved settings. For the selected ones that are automatically set in view of consumption distance (d), the last settings are the settings last automatically set in view of the last preference denoted for consumption distance (d). While entertainment system 100 is being operated by rendering subsystem 106 in the above described manner, at step 416, inference engine 116 periodically checks to determine if the current setting for consumption distance (d) 104 is appropriate for the current entertainment program and user combination. Inference engine 116 makes the determination by comparing the current setting for consumption distance (d) 104 with what it infers to be the appropriate setting for (d). For the illustrated embodiment, inference engine 116 infers the appropriate setting for (d) by first inferring the identity of the current user, and then retrieves the preferred setting for (d) from user preference storage 112 based on the inferred user identity and the current entertainment program type. The identity of the current user is inferred based on characteristics of the current entertainment program and previously accumulated consumption habit data, as disclosed in the above referenced U.S. patent application.

If the current setting for consumption distance (d) 104 is determined to be appropriate for the current entertainment program and user combination, inference engine 116 takes no further action. On the other hand, if the current setting for consumption distance (d) 104 is determined to be inappropriate for the current entertainment program and user combination, inference engine 116 proceeds to step 418 and adjusts the current setting for consumption distance (d) accordingly, causing the appropriate corresponding parameter values to be outputted from storage 110b and stored into 110a. In response, rendering subsystem 106 refreshes its operating parameters, re-retrieving their current values, step 412, including those automatically re-set responsive to the action of inference engine 116. As a result, under this novel approach, the user experience is further improved by further eliminating the need of the user from even having to pick a consumption distance (d). Under this approach, the selection is automatically made for the user. Nevertheless the user is free to override it in the event the user is satisfied with the selection.

Figure 5:
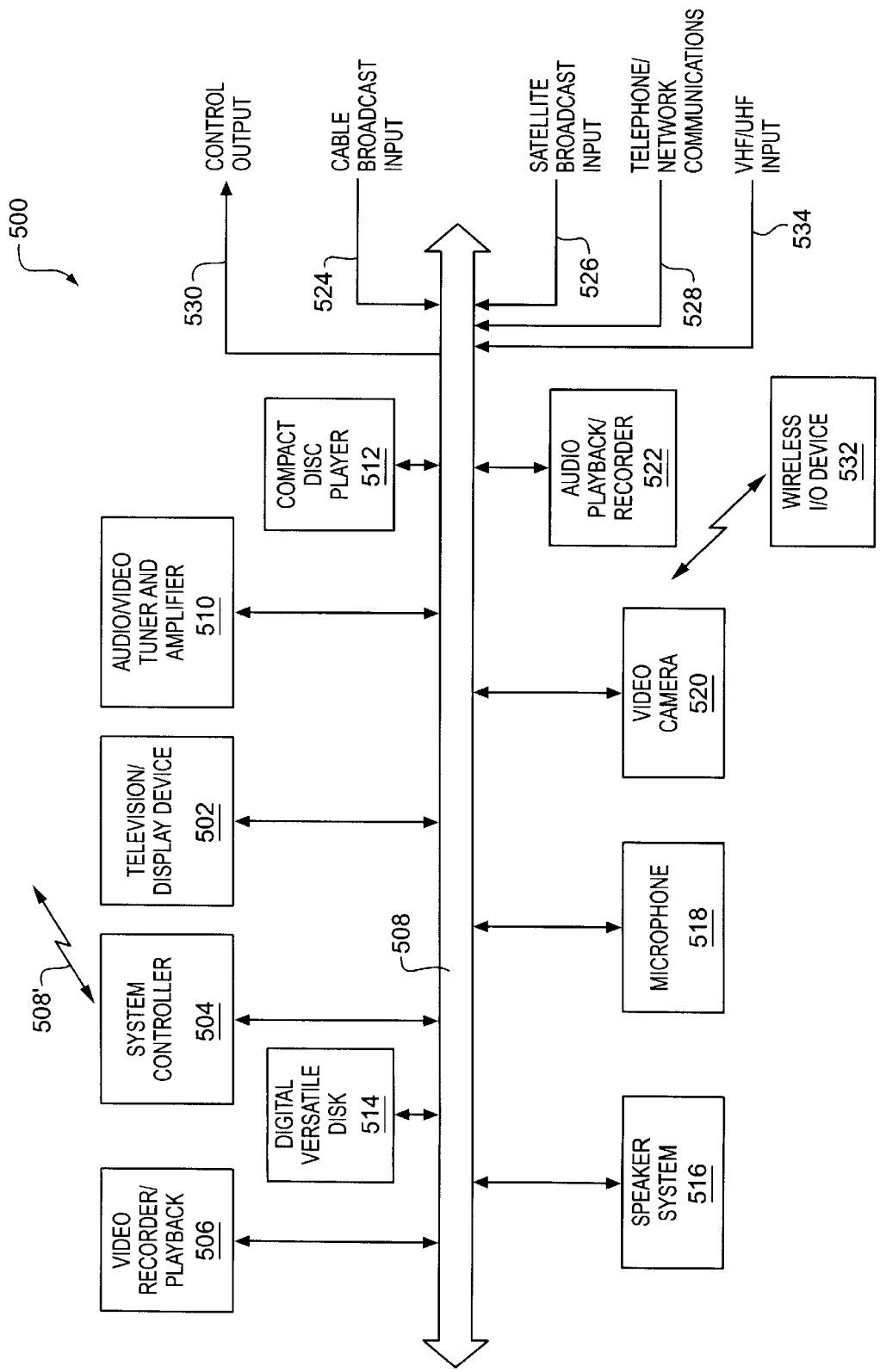
FIG. 5 is a block diagram illustrating the system components of an exemplary entertainment system in which one embodiment of the present invention may be practiced.

FIG. 5 is a block diagram illustrating an exemplary entertainment system suitable for use to practice the present invention. Exemplary entertainment system 500 includes television/display device 502, video recorder/playback device 506, digital video disk (DVD, also referred to as digital versatile disk) recorder/playback device 514, audio/video tuner and/or amplifier 510, audio playback/recorder device 522, and compact disc (CD) player 512, all coupled to a common input/output (I/O) bus 508. Each of these elements performs its conventional functions known in the art. Their constitutions are well known, accordingly will not be individually further described. However, it is to be appreciated that the use of the common I/O bus 508 is for ease of explanation only, and that a number of alternative means of routing input and output signals may be beneficially employed. For example, audio input and output could be routed with an appropriate number of independent audio "patch" cables, video signals may be routed with independent coaxial cables, and control signals may be routed along a two-wire serial line, or through infrared (IR) communication signals or radio frequency (RF) communication signals. By way of further example, audio, video, and/or control signals may also be routed along one or more buses in accordance with the Universal Serial Bus Specification, Revision 1.0 (Jan. 15, 1996), or the High Performance Serial Bus IEEE Standard 1394, IEEE std. 1394-1995, draft 8.0v3, approved Dec. 12, 1995.

Still referring to FIG. 5, exemplary entertainment system 500 further includes speaker system 516, microphone 518, video camera 520 and a wireless input/output control device 532. In one embodiment, wireless I/O control device 532 is an entertainment system remote control unit which communicates with the components of system 500 through IR signals. In another embodiment, wireless I/O control device 532 may be a wireless keyboard and/or cursor control device that communicates with the components of system 500 through IR signals or RF signals. In yet another embodiment, wireless I/O control device 532 may be an IR or RF remote control device similar in appearance to a typical entertainment system remote control with the added feature of a track-ball or other cursor control mechanism that allows a user to position a cursor on a display of system 500. Similarly, these elements also perform their conventional functions known in the art. Their constitutions are well known, and will not be further described.

At the core of system 500 is system controller 504 incorporated with the teachings of the present invention, and configured to control a variety of features associated with the system components to effectuate the consumption distance based customized rendering of the present invention. As depicted, system controller 504 is coupled to each of the system components, as necessary, through I/O bus 508. In one embodiment, in addition to or in place of I/O bus 508, system controller 504 may be configured with a wireless communications transmitter (or transceiver), which is capable of communicating with the system components via IR signals or RF signals 508'. Regardless of the control medium, system controller 504 is configured to control each of the entertainment system components of system 500, although it is understood that each of the components may be individually controlled with wireless I/O device 532.

As shown, exemplary entertainment system 500 can be configured to receive entertainment programming via a wide variety of transport media. In one embodiment, system 500 receives entertainment programming input via any or all of the following transport media: cable broadcast 524, satellite broadcast 526 (e.g., via a satellite dish), very high frequency (VHF) or ultra high frequency (UHF) radio frequency communication of the broadcast networks 534 (e.g., via an aerial antenna), and/or the telephone/computer network interface 528. Further, it will be appreciated by those skilled in the art that cable broadcast input 524, satellite broadcast input 526 and VHF/UHF input 534 may include analog and/or digital programming. Additionally, entertainment programming may be configured to receive entertainment programming from a CD-ROM, DVD, or other digital or analog storage device via a playback device of system 500 (e.g., DVD recorder/playback device 514). The Internet, an entertainment network, or other network may also provide entertainment programming, via, for example, interface 528.

In addition to the entertainment programming inputs, exemplary entertainment system 500 may also be configured to provide a number of general purpose control outputs 530 to control any number of devices. In one embodiment, for example, as system controller 504 configures system 500 to display a movie, it may also dim the lights in the room to a predetermined level to further enhance the viewing environment. Control circuitry which allows a computing device to control, for example, lighting, thermostat settings, and other household appliances (via, for example, the electrical wiring in a house) are well known in the art and thus will not be described further.

Except for the incorporated teachings of the present invention, system controller 504 is intended to represent a broad category of computing devices known in the art. An example of such a computing device is a desktop computer system equipped with a high performance microprocessor(s), such as the Pentium® processor, Pentium® Pro processor, or Pentium® II processor manufactured by and commonly available from Intel Corporation of Santa Clara, Calif. Another example of such a computing device is an Internet "appliance" device, such as a WebTV™ Internet Terminal available from Sony Electronics Inc. of Park Ridge, N.J., or Philips Consumer Electronics Company of Knoxville, Tenn. It is to be appreciated that the housing size and design for system controller 504 may be altered, allowing it to better visually fit into system 500. Regardless of the particular embodiment, system controller 504 may also be referred to as a "convergence system" designed to integrate the world of entertainment systems and computing platforms to achieve the beneficial results of customized commercial rendering discussed earlier.

Although the present invention may be practiced in the context of the exemplary embodiment presented, those skilled in the art will appreciate that the present invention may be practiced in a variety of alternate embodiments. By way of example, devices may be added to system 500, or devices (e.g., video camera 520, microphone 518, DVD recorder/playback device 514, etc.) may be removed from system 500. Furthermore, it is to be appreciated that the several entertainment system components depicted in FIG. 5 can be beneficially combined. By way of example, system controller 504 could be integrated into television/display device 502, DVD recorder/playback device 514, or audio/video tuner and amplifier 510.

Figure 6:
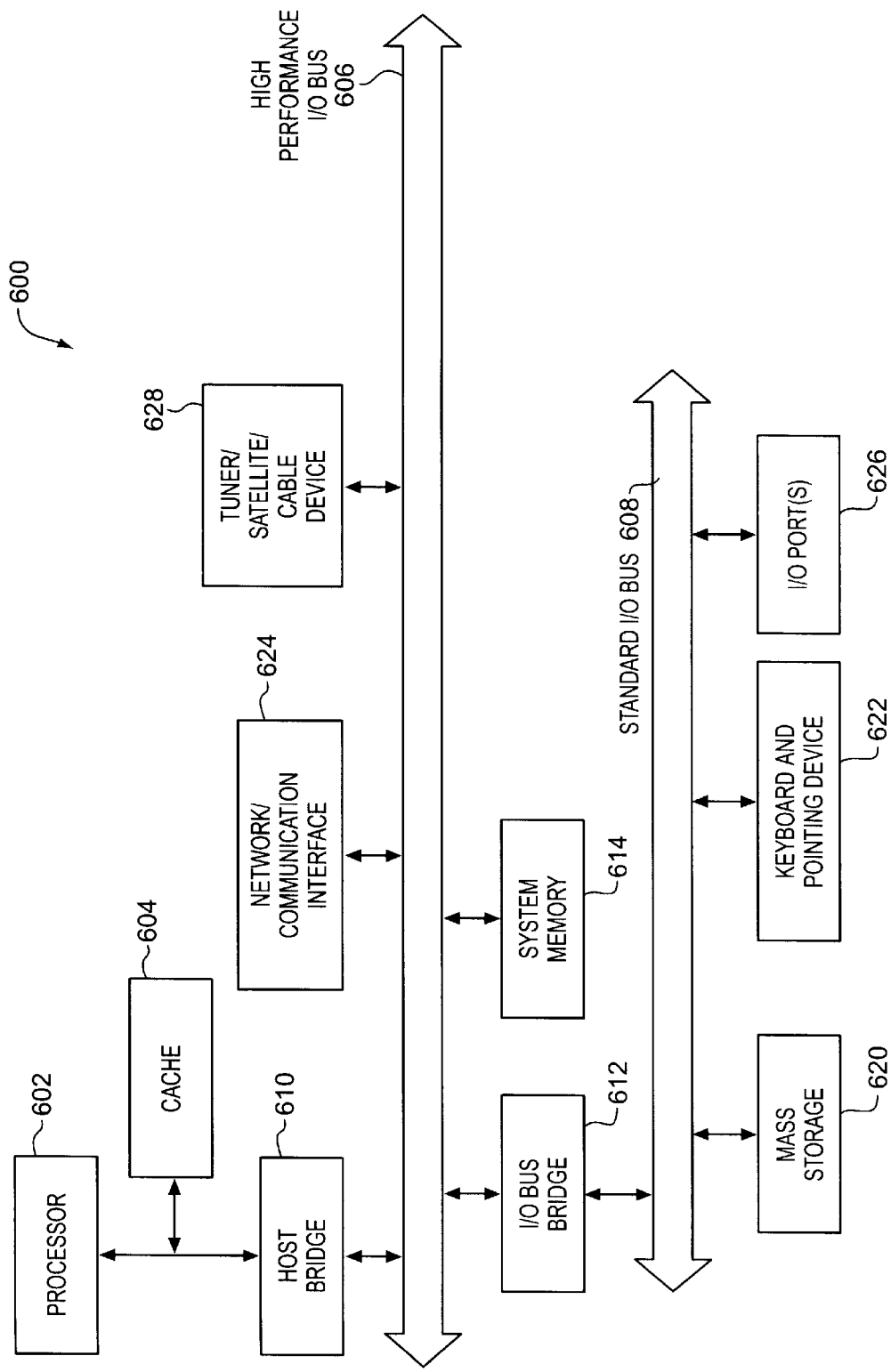
FIG. 6 is a block diagram illustrating the architecture of a system controller according to one embodiment of the present invention.

FIG. 6 illustrates one embodiment of a computing device suitable for use with the present invention. According to one implementation, system controller 504 of FIG. 5 is a computing device 600 of FIG. 6. In the illustrated embodiment, device 600 includes processor 602 and cache memory 604 coupled to each other as shown. Additionally, device 600 includes high performance input/output (I/O) bus 606 and standard I/O bus 608. Host bridge 610 couples processor 602 to high performance I/O bus 606, whereas I/O bus bridge 612 couples the two buses 606 and 608 to each other. Coupled to bus 606 are network/communication interface 624 and system memory 614. Coupled to bus 608 is mass storage 620, keyboard and pointing device 622, and I/O ports 626. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 606. As illustrated, analog tuner/digital satellite/cable devices 628, are also coupled to high performance I/O bus 606 to allow device 600 to "tune" to various programming input channels.

These elements 602–628 perform their conventional functions known in the art. In particular, network/communication interface 624 is used to provide communication between device 600 and any of a wide range of conventional networks, such as an Ethernet, token ring, the Internet, etc. It is to be appreciated that the circuitry of interface 624 is dependent on the type of network the device 600 is being coupled to.

Mass storage 620 is used to provide permanent storage for the data and programming instructions, whereas system memory 614 is used to provide temporary storage for the data and programming instructions when executed by processor 602. I/O ports 626 are one or more serial and/or parallel communication ports used to provide communication between additional peripheral devices which may be coupled to device 600.

It is to be appreciated that various components of device 600 may be re-arranged. For example, cache 604 may be on-chip with processor 602. Alternatively, cache 604 and processor 602 may be packaged together as a "processor module", with processor 602 being referred to as the "processor core". Furthermore, certain implementations of the present invention may not require nor include all of the above components. For example, keyboard and pointing device 622, and/or network/communication interface 624 may not be included in device 600. Additionally, the peripheral devices shown coupled to standard I/O bus 608 may be coupled to high performance I/O bus 606; in addition, in some implementations only a single bus may exist with the components of device 600 being coupled to the single bus. Furthermore, additional components may be included in device 600, such as additional processors, storage devices, or memories.

In one embodiment, the method and apparatus for consumption distance based customized rendering described above, including the subsystems of FIG. 1 and the steps illustrated in FIGS. 4a–4b, is implemented as a series of software routines run by device 600 of FIG. 6. In this embodiment, the various steps described with references to FIGS. 4a–4b are performed by a series of software routines. These software routines comprise a plurality or series of instructions to be executed by a processor in a hardware system, such as processor 602. Initially, the series of instructions and their working data are stored on a storage device, such as mass storage 620. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 624. The instructions and data are copied from the storage device, such as mass storage 620, into memory 614 and then accessed and executed by processor 602. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, steps of FIGS. 4a–4b could be performed by combinatorial logic implemented in one or more ASICs of an additional circuit board for addition to device 600.

Thus, a method and apparatus for consumption distance based customized rendering of entertainment programming has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:
    determining a consumption distance;
    setting at least one of cell sizes, font sizes, icon sizes, and button sizes to be rendered on a display device of an entertainment system to one of a plurality of parameter values for an entertainment program based on the consumption distance; and
    operating the entertainment system to render the entertainment program on the display device for the consumption distance using the set parameter values.

2. The method of claim 1, wherein determining a consumption distance further comprises receiving the consumption distance from a user.

3. The method of claim 1, wherein the method further comprises dynamically determining the consumption distance.

4. The method of claim 3, wherein the dynamic determination of the consumption distance is performed in view of one or more characteristics associated with the entertainment program.

5. The method of claim 3, wherein the dynamic determination of the consumption distance is performed in view of one or more characteristics associated with a user of the entertainment program.

6. The method of claim 1 wherein setting comprises retrieving a preferred setting for the consumption distance from an operating parameter user preference storage based on a user identity and the entertainment programming type.

7. The method of claim 1 further comprising periodically checking to determine whether the current parameter value settings are appropriate for the current entertainment program and user combination and resetting the current parameter value setting to other parameter values if it is determined that the settings are not appropriate.

8. The method of claim 1 wherein setting comprises determining the entertainment programming type and retrieving a preferred setting for the consumption distance from an operating parameter user preference storage based on the entertainment programming type.

9. An article of manufacture comprising a recordable medium having recorded thereon a plurality of executable programming instructions usable to program an apparatus to enable the apparatus to be able to cause an entertainment system to render an entertainment program for a consumption distance by determining a consumption distance and setting at least one of cell sizes, font sizes, icon sizes, and button sizes to be rendered on a display device of the entertainment system to a plurality of parameter values in view of the consumption distance.

10. The article of claim 9, wherein the programming instructions further enable the apparatus to be able to determine the consumption distance by receiving the consumption distance from a user.

11. The article of claim 8, wherein the programming instructions further enable the apparatus to be able to dynamically determine the consumption distance.

12. The article of claim 11, wherein the programming instructions further enable the apparatus to be able to perform the dynamic determination of the consumption distance in view of one or more characteristics associated with the entertainment program.

13. The article of claim 11, wherein the programming instructions further enable the apparatus to be able to perform the dynamic determination of the consumption distance in view of one or more characteristics associated with a user of the entertainment program.

14. An entertainment system comprising:
    a mechanism to determine a consumption distance and to set at least one of cell sizes, font sizes, icon sizes, and button sizes to be rendered on a display device of the entertainment system to a plurality of parameter values for rendering an entertainment program for the consumption distance;
    a plurality of storage locations to hold the parameter values; and
    a rendering subsystem coupled to the storage locations to render the entertainment program for the consumption distance using the set parameter values.

15. The entertainment system of claim 14, wherein the mechanism further includes a user interface to facilitate receipt of the consumption distance from a user.

16. The entertainment system of claim 15, wherein the mechanism dynamically determines the consumption distance.

17. The entertainment system of claim 16, wherein the mechanism makes the dynamic determination of the consumption distance in view of one or more characteristics associated with the entertainment program.

18. The entertainment system of claim 16, wherein the mechanism makes the dynamic determination of the consumption distance in view of one or more characteristics associated with a user of the entertainment program.

19. An apparatus comprising:
    means for determining a consumption distance for an entertainment program in view of one or more characteristics associated with the entertainment program;
    means for setting a plurality of scalable operating parameters of an entertainment system to a plurality of parameter values to cause the entertainment system to render the entertainment program for the consumption distance;
    means for periodically checking to determine whether current parameter value settings are appropriate for a current entertainment program and user combination; and
    means for resetting the plurality of operating system parameters to other parameter values if it is determined that the settings are not appropriate.

20. The apparatus of claim 19, wherein the apparatus further comprises means for receiving the consumption distance from a user.

21. A method comprising:
    setting a plurality of operating parameters of an entertainment system to a plurality of parameter values for rendering an entertainment program for a user;
    periodically checking to determine whether the current parameter value settings are appropriate for the current entertainment program and user combination;
    resetting the plurality of operating system parameters to other parameter values if it is determined that the settings are not appropriate; and
    operating the entertainment system to render the entertainment program for the user using the parameter values set for the operating parameters.

22. The method of claim 21, wherein the method further comprises receiving a consumption distance from a user and applying the consumption distance to determine the parameter values.

23. The method of claim 21, wherein the determination of the parameter values is performed in view of one or more characteristics associated with a user of the entertainment program.

24. The method of claim 21, wherein the entertainment program is a web based program.

25. An article of manufacture comprising a recordable medium having recorded thereon a plurality of executable programming instructions usable to program an apparatus to enable the apparatus to be able to cause an entertainment system to render an entertainment program for a consumption distance by setting a plurality of operating parameters of the entertainment system to a plurality of parameter values in view of the consumption distance, the parameter values being determined in view of the consumption distance, the current parameter value settings being periodically checked to determine whether they are appropriate for the current entertainment program and user combination, the current parameter value settings being reset to other parameter values if it is determined that the settings are not appropriate.

26. The article of claim 25, wherein the programming instructions further enable the apparatus to be able to receive the consumption distance from a user and apply the consumption distance to determine the parameter values.

27. The article of claim 25, wherein the programming instructions further enable the apparatus to be able to perform the determination of the parameter values in view of one or more characteristics associated with a user of the entertainment program.

28. The article of claim 25, wherein the entertainment program is a web based program.

29. An entertainment system comprising:
a mechanism to set a plurality of operating parameters of the entertainment system to a plurality of parameter values for rendering an entertainment program for a consumption distance, the mechanism determining the parameter values in view of the consumption distance and determining the consumption distance in view of one or more characteristics associated with the entertainment program;
a plurality of storage locations to hold the parameter values;
an inference engine to periodically check to determine whether the current parameter value settings are appropriate for a current entertainment program and user combination and to reset the plurality of operating system parameters to other parameter values if it is determined that the settings are not appropriate; and
a rendering subsystem coupled to the storage locations to render the entertainment program for the consumption distance using the parameter values set for the operating parameters.

30. The entertainment system of claim 29, wherein the mechanism further includes a user interface to facilitate receipt of the consumption distance from a user.

31. The entertainment system of claim 29, wherein the mechanism makes the determination of the consumption distance in view of one or more characteristics associated with a user of the entertainment program.

32. The entertainment system of claim 29, wherein the entertainment program is a web based program.

33. A method comprising
receiving a consumption distance preference for the use of an entertainment system from an entertainment system user;
selecting a set of operating parameter values based on the consumption distance preference from a stored set of operating parameter values; and
rendering received entertainment programming in accordance with the selected operating parameter values.

34. The method of claim 33 wherein receiving a consumption distance preference comprises receiving a television remote control signal.

35. The method of claim 33 wherein selecting a set of operating parameter values comprises retrieving operating parameter values from a consumption distance based operating parameter value storage and storing the selected operating parameters in an operating parameter current values storage.

36. The method of claim 33 wherein selecting a set of operating value parameter values comprises automatically setting operating parameter values in accordance with a consumption distance.

37. The method of claim 33 wherein selecting a set of operating parameter values comprises retrieving the last operating parameter values selected in view of the last received consumption distance preference.

38. The method of claim 33 wherein entertainment programming includes one or more of publicly broadcast television and radio programming received through AM/FM, VHF/UHF, cable, satellite, tapes, diskettes, compact disks, digital versatile disks.

39. The method of claim 33 wherein the operating parameters comprise one or more of font sizes, button sizes and icon sizes.

40. A method comprising
retrieving the last setting in an entertainment system for operating parameter values, the operating parameter values being associated with a consumption distance;
rendering received entertainment programming in accordance with the retrieved settings;
periodically checking to determine if the current setting for consumption distance is appropriate for the current entertainment program and user combination by comparing the current setting for consumption distance with an inferred appropriate setting; and
if the current setting for consumption distance is determined to be inappropriate for the current entertainment program and user combination, then adjusting the setting for consumption distance accordingly.

41. The method of claim 40 wherein adjusting comprises retrieving values from a consumption distance based operating parameter value storage and causing the values to be stored in an operating parameter current values storage, and refreshing system operating parameters for rendering the entertainment system programming using the operating parameter current values storage.

42. The method of claim 41 wherein the inferred appropriate setting is determined by:
inferring the identity of the current user;
determining the entertainment programming type;
retrieving the preferred setting for the consumption distance from an operating parameter user preference storage based on the inferred user identity and the entertainment programming type.

43. The method of claim 42 wherein inferring the identity of the user comprises comparing the entertainment programming type with previously accumulated consumption habit data for different users.

44. The method of claim 41 wherein entertainment programming includes one or more of publicly broadcast television and radio programming received through AM/FM, VHF/UHF, cable, satellite, tapes, diskettes, compact disks, digital versatile disks.

45. The method of claim 41 wherein the operating parameters comprise one or more of font sizes, button sizes and icon sizes.

46. An apparatus for rendering entertainment programming comprising:

a rendering subsystem for rendering entertainment programming in accordance with current values of operating parameters; and an operating parameter setting subsystem operatively coupled to the rendering subsystem having an operating parameter current value storage for storing current values of operating parameters for use by the rendering subsystem, a consumption distance based operating parameter value storage for storing a collection of operating parameter values for a number of different consumption distances and an inference engine for automatically determining an appropriate consumption distance for use in selecting values from the operating parameter value storage to store in the operating parameter current value storage.

47. The apparatus of claim 46 wherein the operating parameter setting subsystem further includes a user interface for receiving a consumption distance preference from a user and for causing values from consumption distance based operating parameter value storage to be selected and stored in operating parameter current value storage.

48. The apparatus of claim 47 wherein the user interface comprises one or more of a keyboard, a selection list, a sliding bar and sliding direction buttons.

49. The apparatus of claim 46 wherein the operating parameter setting subsystem further includes user preference storage for storing various user preferences including a preference for consumption distance associated with an entertainment programming type and a user identity.

50. The apparatus of claim 49 wherein the inference engine sets the current operating parameter values depending on the type of programming being rendered.

51. The apparatus of claim 49 wherein the inference engine infers a user identity from the type of entertainment program and selects user preferences from the user preference storage for storing in the operating parameter current value storage using the inferred user identity.

52. The apparatus of claim 46 wherein entertainment programming includes publicly broadcast television and radio programming received through AM/FM, VHF/UHF, cable, satellite, tapes, diskettes, compact disks, digital versatile disks.

53. The apparatus of claim 46 wherein the operating parameters are scalable.

54. The apparatus of claim 46 wherein the operating parameters comprise one or more of font sizes, button sizes, and icon sizes.

55. An article of manufacture comprising a recordable medium having recorded thereon a plurality of executable programming instructions usable to program an apparatus to enable the apparatus to be able to cause an entertainment system to:

receive a consumption distance preference for the use of the entertainment system from an entertainment system user;

select a set of operating parameter values based on the consumption distance preference from a stored set of operating parameter values; and render received entertainment programming in accordance with the selected operating parameter values.

56. The article of claim 55, wherein the programming instructions further enable the apparatus to be able to retrieve operating parameter values from a consumption distance based operating parameter value storage and store the selected operating parameters in an operating parameter current values storage.

57. The article of claim 55, wherein the programming instructions further enable the apparatus to be able to automatically set operating parameter values in accordance with a consumption distance.

58. The article of claim 55, wherein the programming instructions further enable the apparatus to be able to retrieve the last operating parameter values selected in view of the last received consumption distance preference.

59. The article of claim 55, wherein entertainment programming includes one or more of publicly broadcast television and radio programming received through AM/FM, VHF/UHF, cable, satellite, tapes, diskettes, compact disks, digital versatile disks.

60. The article of claim 55, wherein the operating parameters comprise one or more of font sizes, button sizes and icon sizes.

61. The article of claim 58, wherein the programming instructions further enable the apparatus to be able to periodically check to determine if the current setting for consumption distance is appropriate for the current entertainment program and user combination by comparing the current setting for consumption distance with an inferred appropriate setting; and if the current setting for consumption distance is determined to be inappropriate for the current entertainment program and user combination, then adjusting the setting for consumption distance accordingly.

62. The article of claim 61, wherein the programming instructions further enable the apparatus to be able to adjust the setting by retrieving values from a consumption distance based operating parameter value storage and causing the values to be stored in an operating parameter current values storage, and refreshing system operating parameters for rendering the entertainment system programming using the operating parameter current values storage.

63. The article of claim 61, wherein the programming instructions further enable the apparatus to be able to infer the identity of the current user; determine the entertainment programming type; and retrieve the preferred setting for the consumption distance from an operating parameter user preference storage based on the inferred user identity and the entertainment programming type.

64. The article of claim 63, wherein the programming instructions further enable the apparatus to be able to compare the entertainment programming type with previously accumulated consumption habit data for different users to infer the identity of the current user.

65. The article of claim 55, wherein the programming instructions further enable the apparatus to be able to store various user preferences including a preference for consumption distance associated with an entertainment programming type and a user identity.

66. The article of claim 55, wherein the programming instructions further enable the apparatus to be able to set the current operating parameter values depending on the type of programming being rendered.

* * * * *

UNITED STATES PATENT AND TRADEMARK OFFICE
CERTIFICATE OF CORRECTION

PATENT NO. : 6,330,718 B1  Page 1 of 1
DATED : December 11, 2001
INVENTOR(S) : Shah-Nazaroff et al.

It is certified that error appears in the above-identified patent and that said Letters Patent is hereby corrected as shown below:

Column 3,
Line 22, delete "used" and insert -- use --.

Signed and Sealed this

Twenty-fifth Day of June, 2002

Attest:

Attesting Officer

JAMES E. ROGAN
Director of the United States Patent and Trademark Office